US012654179B2

(12) United States Patent
Mochizuki

(10) Patent No.: US 12,654,179 B2
(45) Date of Patent: Jun. 16, 2026

(54) FLOCCULATION CYCLONE DEVICE, MARINE PLASTIC REMOVAL SYSTEM USING THE SAME, SHIP PROVIDED WITH THE SYSTEM, AND OPERATION METHOD FOR THE SHIP

(71) Applicant: Ambitious Technologies, Ltd., Mito (JP)

(72) Inventor: Akira Mochizuki, Mito (JP)

(73) Assignee: Ambitious Technologies, Ltd., Mito (JP)

( * ) Notice: Subject to any disclaimer, the term of this patent is extended or adjusted under 35 U.S.C. 154(b) by 369 days.

(21) Appl. No.: 18/286,655

(22) PCT Filed: Jan. 14, 2022

(86) PCT No.: PCT/JP2022/001157
§ 371 (c)(1),
(2) Date: Oct. 12, 2023

(87) PCT Pub. No.: WO2022/239298
PCT Pub. Date: Nov. 17, 2022

(65) Prior Publication Data
US 2024/0189834 A1 Jun. 13, 2024

(30) Foreign Application Priority Data

May 13, 2021 (JP) ................................. 2021-081578

(51) Int. Cl.
*B04C 9/00* (2006.01)
*B03C 1/28* (2006.01)
(Continued)

(52) U.S. Cl.
CPC ................ *B04C 9/00* (2013.01); *B03C 1/288* (2013.01); *B03C 1/30* (2013.01); *B04C 5/103* (2013.01);
(Continued)

(58) Field of Classification Search
CPC B04C 9/00; B04C 5/103; B04C 5/081; B04C 5/12; B04C 11/00; B03C 1/288;
(Continued)

(56) References Cited

U.S. PATENT DOCUMENTS 4,731,101 A 3/1988 Kanda
2004/0178152 A1* 9/2004 Morse .................... B03D 1/028
210/705
(Continued)

FOREIGN PATENT DOCUMENTS

JP 52-136279 U1 10/1977
JP 54-4681 Y2 2/1979
(Continued)

OTHER PUBLICATIONS

English translation of WO_2009101528, Dec. 23, 2009. (Year: 2009).*
(Continued)

*Primary Examiner* — Joseph W Drodge
(74) *Attorney, Agent, or Firm* — Crowell & Moring LLP

(57) ABSTRACT

Conventional liquid cyclone devices tend to break flocs and thus cannot be used for floc separation. Further, there are no ballast water treatment devices that can simultaneously remove plastics and microplastics floating in the sea. In addition, there are no ships or ship operation methods that address the problem of pollution due to plastics and micro-plastics floating in the sea.
To achieve cyclone separation of a fluid including easily broken flocs, flocs that include a magnetic body are guided by means of centrifugal force and magnetic force to a flow in the vicinity of an outer shell of a cyclone, then to a channel between an inner shell and the outer shell, and discharged from a lower outlet. The inner shell prevents an
(Continued)

upward flow from affecting the flocs, making it possible to achieve reliable separation of the flocs.

11 Claims, 9 Drawing Sheets

(51) Int. Cl.

| | |
|---|---|
| *B03C 1/30* | (2006.01) |
| *B04C 5/103* | (2006.01) |
| *B63J 4/00* | (2006.01) |
| *C02F 1/38* | (2023.01) |
| *C02F 1/48* | (2023.01) |
| *C02F 1/52* | (2023.01) |
| *C02F 101/30* | (2006.01) |
| *C02F 103/00* | (2006.01) |

(52) U.S. Cl.

CPC ................. *B63J 4/002* (2013.01); *C02F 1/38* (2013.01); *C02F 1/482* (2013.01); *C02F 1/488* (2013.01); *C02F 1/5281* (2013.01); *B03C 2201/18* (2013.01); *B03C 2201/30* (2013.01); *C02F 2101/30* (2013.01); *C02F 2103/008* (2013.01); *C02F 2201/008* (2013.01); *C02F 2303/26* (2013.01)

(58) Field of Classification Search

CPC ... B03C 1/30; B03C 2201/18; B03C 2201/30; B03C 2201/20; B03C 2201/22; B03C 1/01; B03C 1/10; B03C 1/14; B03C 1/28; B03C 1/005; B03C 1/02; B03C 1/32; B63J 4/002; C02F 1/38; C02F 1/482; C02F 1/488; C02F 1/5281; C02F 2101/30; C02F 2103/008; C02F 2201/008; C02F 2303/26; C02F 1/56; C02F 1/004; C02F 1/32; C02F 1/78; C02F 2301/026; B63B 35/32; Y02W 30/62; B01D 21/0009; B01D 21/26; B01D 21/265; B01D 21/267; B01D 21/286

See application file for complete search history.

(56) References Cited

U.S. PATENT DOCUMENTS

| | | | |
|---|---|---|---|
| 2007/0039894 A1* | 2/2007 | Cort ........................ | B03C 1/288 |
| | | | 210/695 |
| 2016/0221845 A1* | 8/2016 | Cort ........................ | C02F 1/481 |
| 2021/0154685 A1 | 5/2021 | Porkert | |
| 2021/0179467 A1* | 6/2021 | Cort ........................ | C02F 9/00 |

FOREIGN PATENT DOCUMENTS

| | | | | | |
|---|---|---|---|---|---|
| JP | 57-13185 | Y2 | | 3/1982 | |
| JP | 61-25846 | Y2 | | 8/1986 | |
| JP | 63-41115 | Y2 | | 10/1988 | |
| JP | 2-36625 | Y2 | | 10/1990 | |
| JP | 3569915 | B | | 9/2004 | |
| JP | 2011083696 | A | * | 4/2011 | |
| JP | 5945309 | B | | 7/2016 | |
| JP | 2017-176906 | A | | 10/2017 | |
| JP | 2018-73074 | A | | 5/2018 | |
| JP | 2020-524605 | A | | 8/2020 | |
| KR | 20150013311 | A | * | 2/2015 | ........ B01D 21/0012 |
| WO | WO 96/06683 | A1 | | 3/1996 | |
| WO | WO-2009153980 | A1 | * | 12/2009 | ............ B24B 55/03 |

OTHER PUBLICATIONS

English translation of JP 2011083696, Apr. 28, 2011. (Year: 2011).*

International Search Report (PCT/ISA/210) issued in PCT Application No. PCT/JP2022/001157 dated Mar. 8, 2022 with English translation (5 pages).

Japanese-language Written Opinion (PCT/ISA/237) issued in PCT Application No. PCT/JP2022/001157 dated Mar. 8, 2022 with English translation (7 pages).

* cited by examiner

SEAWATER OR
FRESH WATER

FLOCCULATION CYCLONE DEVICE, MARINE PLASTIC REMOVAL SYSTEM USING THE SAME, SHIP PROVIDED WITH THE SYSTEM, AND OPERATION METHOD FOR THE SHIP

TECHNICAL FIELD

The present invention relates to a flocculation cyclone device that uses centrifugal force and magnetic force to remove microplastics from ballast water from which large-sized plastics were collected, a marine plastic removal system that purifies the ballast water using the flocculation cyclone device, a ship provided with the marine plastic removal system, and an operation method for the ship.

BACKGROUND ART

Plastics discarded in the sea have become a global marine pollution problem. About 90% of the plastics in the sea are said to be caused by microplastics discharged from washing machines into the sea through sewage, dust generated by the wear of travelling tires, and dust in cities. Other plastics are also finely decomposed by ultraviolet light, fluid force, or the like, and become microplastics with a size of several tens of microns to several millimeters. It has been reported that aquatic and marine organisms such as fish mistakenly take plastics and microplastics floating in the sea into their bodies as bait and die as a result.

Furthermore, harmful substances may adhere to the microplastics, and there is a fear that eating fish or the like containing the microplastics may have a great impact on human health. Therefore, a method for removing plastics and microplastics floating in the sea has been desired.

Patent Documents 1 to 4 are known as the background of the technical field of the present invention. Patent Document 1 discloses a flocculation cyclone device configured to attract magnetic flocs by means of an electromagnet disposed at a position opposed to the flow of a fluid entering a cyclone. Patent Document 2 discloses a cyclone having a double tube structure and thereby preventing coarse dust from rising with an ascending air current. Patent Document 3 discloses a ballast water treatment system, in which additional ballast water treatment is performed when a result of water quality inspection does not satisfy a discharge regulation value for ballast water. Patent Document 4 discloses a method of generating a planned route for reducing occurrence of facing-each-other between ships while keeping profitability in route selection.

CITATION LIST

Patent Document

[Patent Document 1] JP 2017-176906A
[Patent Document 2] JP 3569915B2
[Patent Document 3] JP 5945309B2
[Patent Document 4] JP 2018-073074A

SUMMARY OF THE INVENTION

Problems to be Solved by the Invention

In Patent Document 1, floating substances in raw water are flocculated together with magnetic bodies such as magnetite to form a floc, and a liquid cyclone is used to separate fluid containing the flocs into water and flocs by means of centrifugal force and magnetic force. In this method, an electromagnet is disposed opposite to the flow direction of the fluid, so that the flocs rush toward the poles exhibiting the maximum magnetic force to be fixed to the outer wall of the cyclone by the magnetic force of the electromagnet. To cope with this, the electromagnet is turned off to stop a current flow, thereby creating a state in which no magnetic force is generated, which causes the flocs to leave the outer wall of the cyclone, to move along with the flow, and to be discharged from the downstream outlet. However, in this device, the fixed flocs are broken by fluid force acting perpendicular to the magnetic force. Further, since the flow speed is high around the lower outlet of the upstream outlet, turbulence energy is increased there, which causes the flocs to be broken.

Patent Document 2 discloses a cyclone with double tubes to prevent dust from rising with an ascending air current; however, the flocs are broken by the ascending air current.

Patent Document 3 discloses a ballast water purification system that uses a flocculation cyclone to treat ballast water while monitoring water quality; however, no consideration is given to removal of plastics and to the solution of the problem of marine pollution.

In Patent Document 4, the latest route information on a plurality of other ships that takes into account the influence of ocean currents in the sailing sea area of a specific ship is acquired and accumulated, and efficient planned route information is generated based on the accumulated route information; however, marine pollution due to discarded plastics is not considered.

An object of the present invention is therefor to provide a low-cost, small-sized collection device capable of preventing breakage of a floc, which is a mass of magnetic substances such as magnetite and substances floating in a fluid such as plankton and microplastics, when collecting the flocs by means of centrifugal force and magnetic force.

Plastics floating in the sea are collected by a collection mechanism constituted by a mesh filter of a given size. Microplastics with a size of several millimeters or less that cannot be collected by the collection mechanism are collected by a flocculation cyclone device. A slit mechanism is provided near a ballast water intake, and the plastics are subjected to shredding in the slit, whereby clogging of pipe through which ballast water flows is prevented. In addition, satellite information is used to find a sea area where a large amount of plastics are floating, an optimum route in which a large amount of marine plastics can be collected in a short period of time is determined in consideration of the originally planned route and the current position of the ship, and marine plastics in a sea area where there are a large amount of plastics are collected.

Means for Solving the Problems

To solve the above problems, a flocculation cyclone device according to the present invention includes: an inverted truncated cone-shaped outer shell that helically rotates a fluid containing magnetic flocs flowing thereinside; a cylindrical part disposed in the center portion of the outer shell so as to pass through the outer shell upward; a dish-shaped inner shell that is installed inside the outer shell and surrounds the lower portion of the cylindrical part; and a magnet disposed outside the outer shell at a portion in the vicinity of the side surface thereof. A fluid between the cylindrical part and the inner shell is discharged with an upward flow generated in the cylindrical part, while the flocs guided by the magnet between the outer shell and the inner shell are discharged from the lower end of the outer shell.

In the flocculation cyclone device, the cylindrical part is connected to the inner shell by a plurality of intermittently arranged fixing members.

In the flocculation cyclone device, the magnet is attached with a magnetic shield to suppress horizontal magnetic force thereof.

In the flocculation cyclone device, the magnet is disposed such that the flocs are guided along a helical flow.

A marine plastic removal system according to the present invention is a system that purifies ballast water using the flocculation cyclone device. The system collects large plastics floating in the sea using a collection mechanism and collects microplastics that have not been collected by the collection mechanism using the flocculation cyclone device.

In the marine plastic removal system, large plastics floating in the sea are broken by a slit mechanism and collected by the collection mechanism.

A ship according to the present invention is a ship equipped with the above system.

An operation method according to the present invention is a method in which the ship receives, from a planned route information center, planned route information which is generated based on marine traffic information collected from a base station, marine plastic pollution information collected from a satellite, originally planned route information, weather information, ocean current information, and geographical information on an operation route and is operated according to the received planned route information.

Advantages of the Invention

According to the present invention, there can be provided a low-cost, small-sized collection device capable of preventing breakage of a floc, which is a mass of magnetic substances such as magnetite and substances floating in a fluid such as plankton and microplastics, when collecting the flocs by means of centrifugal force and magnetic force.

Further, when collecting floating plastics in the sea with the collection mechanism, it is possible to install the slit mechanism for shredding marine plastics to shred the marine plastics and to thereby collect them with the collection mechanism at a later stage. By collecting microplastics that cannot be broken by the slit mechanism with the flocculation cyclone device, the problem of marine pollution can be solved. Further, by determining, using satellite information, the route to a sea area where a large amount of plastics are floating and collecting the marine plastics in the sea area where there are a large amount of plastics, it is possible to efficiently remove marine pollution.

BEST MODE FOR CARRYING OUT THE INVENTION

Hereinafter, embodiments of the present invention will be described in detail with the drawings. Components having the same function are denoted by the same reference signs, and repeated description may be omitted.

First Embodiment

Ships such as cargo ships take seawater and freshwater into tanks as ballast water when they leave a port with no cargo and discharge the ballast water overboard at a port where cargo is loaded, to thereby balance the weight. The presence of marine plastics or marine organisms such as plankton in the ballast water can cause contamination, so that such substances or organism are desirably removed at the time of discharging the ballast water.

When purifying the ballast water, large-sized plastics floating in the sea are shredded into small pieces by a slit mechanism so as not to clog pipe and then collected by a collection mechanism using a mesh filter. Microplastics with a size of several microns to several millimeters that cannot be collected by the collection mechanism are flocculated with magnetic powder such as magnetite to form a magnetic floc, which is collected by centrifugal force and magnetic force.

In a general cyclone, the floc is broken by turbulent energy. Thus, the floc is circulated inside the cyclone at a low flow velocity so as not to be broken by the turbulent energy. At a low flow velocity, the floc is less likely to move around the outer shell of the cyclone due to less centrifugal force.

Therefore, a magnet is disposed near the outside of the cyclone to attract the floc near the outer shell by means of magnetic force. Furthermore, an inner shell is provided inside the cyclone in order to prevent the floc from being affected by a region of high turbulence energy around the point where an upward flow is generated, whereby the floc is not affected by the upward flow and collected without being broken.

Figure 1:
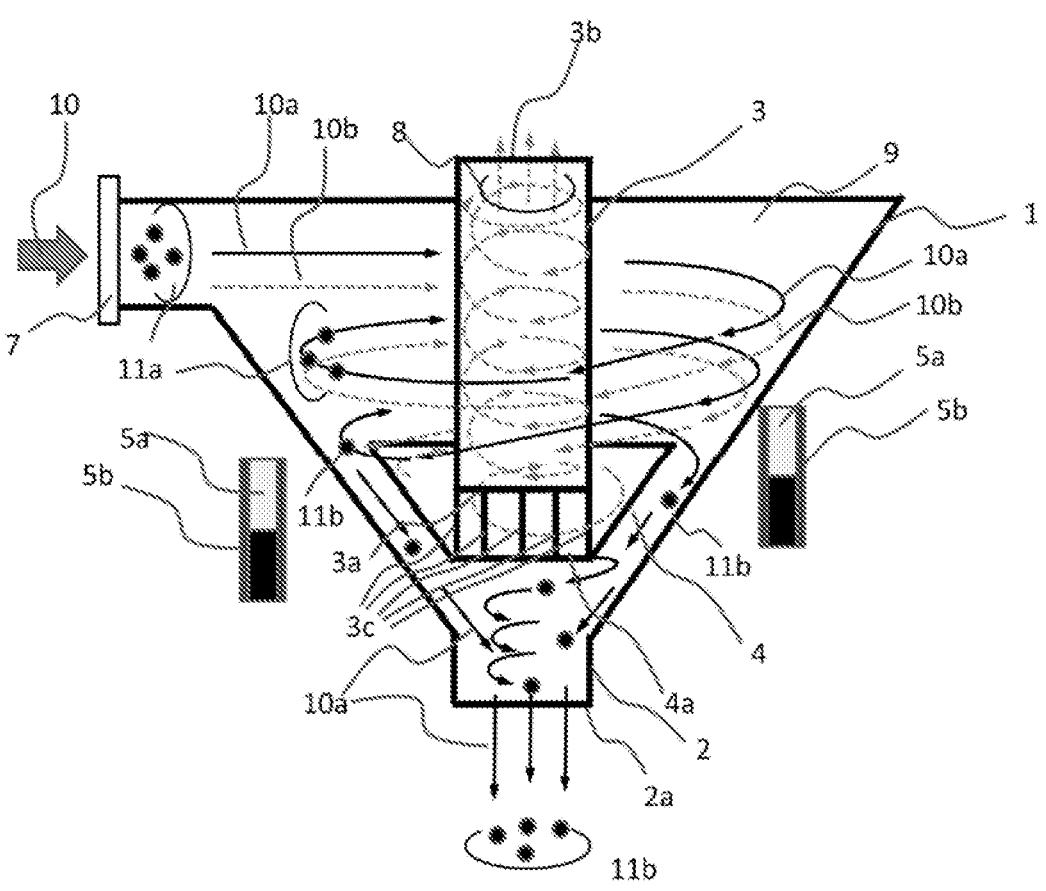
FIG. 1 is an example of a configuration view illustrating a flocculation cyclone device according to the present invention as viewed from the side thereof.

FIG. 1 illustrates an embodiment of a flocculation cyclone device according to the present invention. The flocculation cyclone device has an outer shell 1 of a magnetic cyclone 9 which is a tapered inverted truncated cone-shaped hollow container, a cylindrical part 3 which is vertically arranged at the center portion of the outer shell 1 so as to pass through the outer shell 1 upward, and an inner shell 4 installed inside the outer shell 1 and below the cylindrical part 3. The cylindrical part 3 has a lower inlet 3a and an upper outlet 3b.

The dish-shaped inner shell 4 having an inverted truncated cone shape is fixed to the lower inlet 3a by columnar fixing members 3c such that it surrounds and covers the lower portion of the cylindrical part 3 from the side to the bottom thereof.

A fluid 10 including flocs 11a flows perpendicularly to the cylindrical part 3 into the magnetic cyclone 9 from an inlet 7 provided in the upper part side surface of the outer shell 1. The fluid 10 includes a flow 10a of the flocs 11a and a flow 10b of water or the like. The fluid 10 helically rotates inside the outer shell 1 and around the cylindrical part 3 and moves downward while gradually reducing its diameter following the shape of the outer shell 1. The flocs 11a also flow in the outer shell 1 and around the cylindrical part 3 in a helical manner along with the flow 10a.

The side surface of the inner shell 4 is inclined at the same angle as the inverted truncated cone of the outer shell 1 to form a gap between the outer shell 1 and the inner shell 4. The flocs 11a enter between the outer shell 1 and the inner shell 4 due to centrifugal force and magnetic force of a magnet 5a such as a permanent magnet and are discharged by gravity from a lower outlet 2a of a cylindrical part 2 provided at the lower end of the outer shell 1 as flocs 11b. The flow 10b of the water or the like that enters between the cylindrical part 3 and the inner shell 4 and is thus less affected by the centrifugal force and magnetic force flows from a bottom surface 4a of the inner shell 4 to the lower inlet 3a of the cylindrical part 3 and is discharged with an upward flow 8 generated toward the upper outlet 3b.

If the flocs 11a are fixed to the outer shell 1 by the magnet 5a against the flow 10a, the flocs 11a may be broken. The flocs 11a may also be broken by the flow 10b sucked into the cylindrical part 3. Thus, the flow 10a of the flocs 11a is guided to a portion outside the inner shell 4 and close to the outer shell 1.

The magnet 5a is disposed outside the outer shell 1 in the vicinity of the vertically middle position of the side surface thereof so as to be perpendicular to the flow 10a of the flocs 11a. A plurality of (for example, two or four) magnets 5a may be arranged at predetermined intervals. A magnetic shield 5b is attached to the side surface of the magnet 5a so as to prevent the magnetic force from acting in the horizontal direction.

If the horizontal magnetic force of the magnet 5a does not hinder the flow 10a of the flocs 11a toward the lower outlet 2a of the cylindrical part 2, the magnetic shield 5b may be omitted. The magnet 5a only needs to guide the flocs 11a with the magnetic force acting upward, and since the magnetic cyclone 9 is tapered downward, the magnetic effect at the lower side of the vertically postured magnet 5a is reduced, so that the flow 10a of the flocs 11a toward the lower outlet 2a of the cylindrical part 2 is not hindered.

Figure 2:
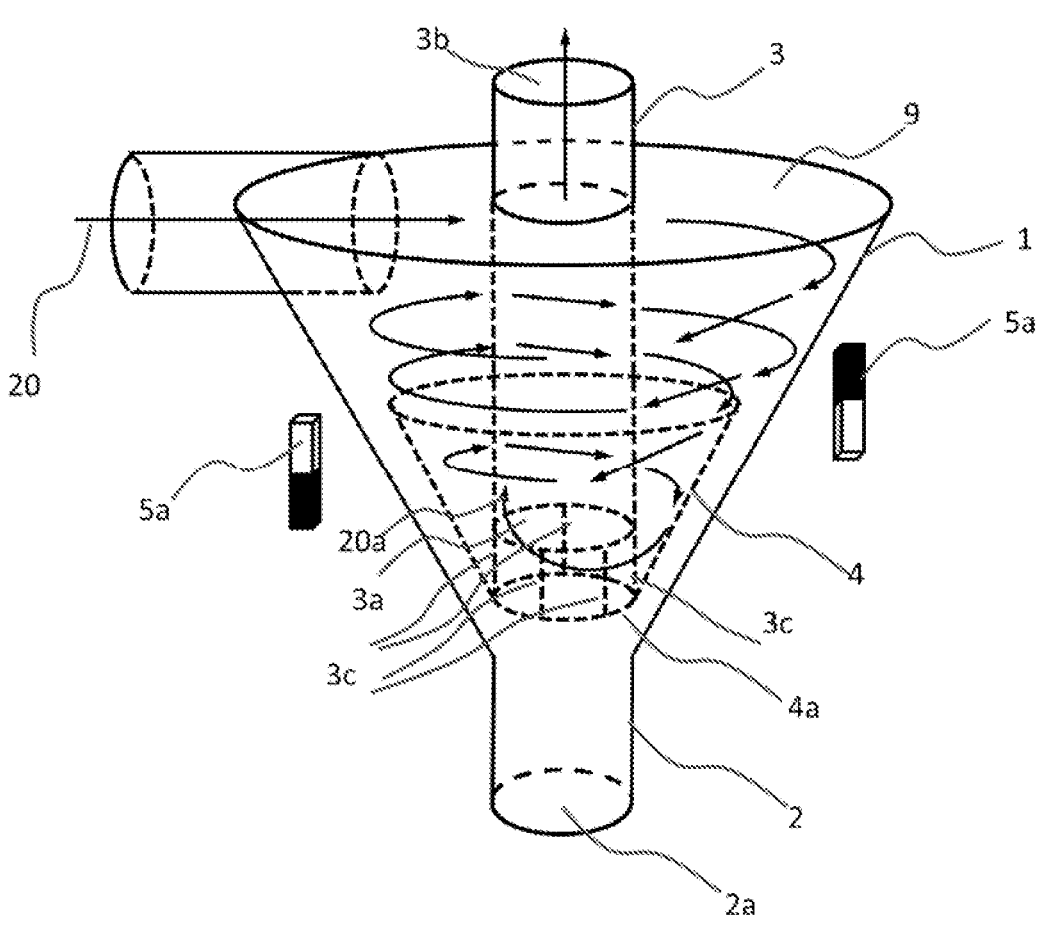
FIG. 2 is a perspective view illustrating the flocculation cyclone device according to the present invention together with the flow of a fluid.

FIG. 2 is a perspective view of the flocculation cyclone device according to the present invention. A fluid 20 containing flocs obtained by flocculating microplastics, plankton, and the like and magnetic substances such as magnetite flows inside the inverted truncated cone-shaped hollow outer shell 1 of the magnetic cyclone 9 and around the cylindrical part 3. The flocs flow into between the outer shell 1 and the dish-shaped inner shell 4 of an inverted truncated cone by the magnetic force of the magnet 5a and then flow toward the lower outlet 2a of the cylindrical part 2.

Water or the like that does not contain floating matter such as flocs flows into between the inner shell 4 and cylindrical part 3, enters from the periphery of the bottom surface 4a of the inverted truncated cone into the lower inlet 3a of the cylindrical part 3, and rises in the cylindrical part 3 to be discharged from the upper outlet 3b. The lower outlet inlet 3a and bottom surface 4a of the inner shell 4 are fixed by columnar fixing members 3c. A gap is provided between the columnar fixing members 3c, allowing an upward flow 20a to be generated.

Figure 3:
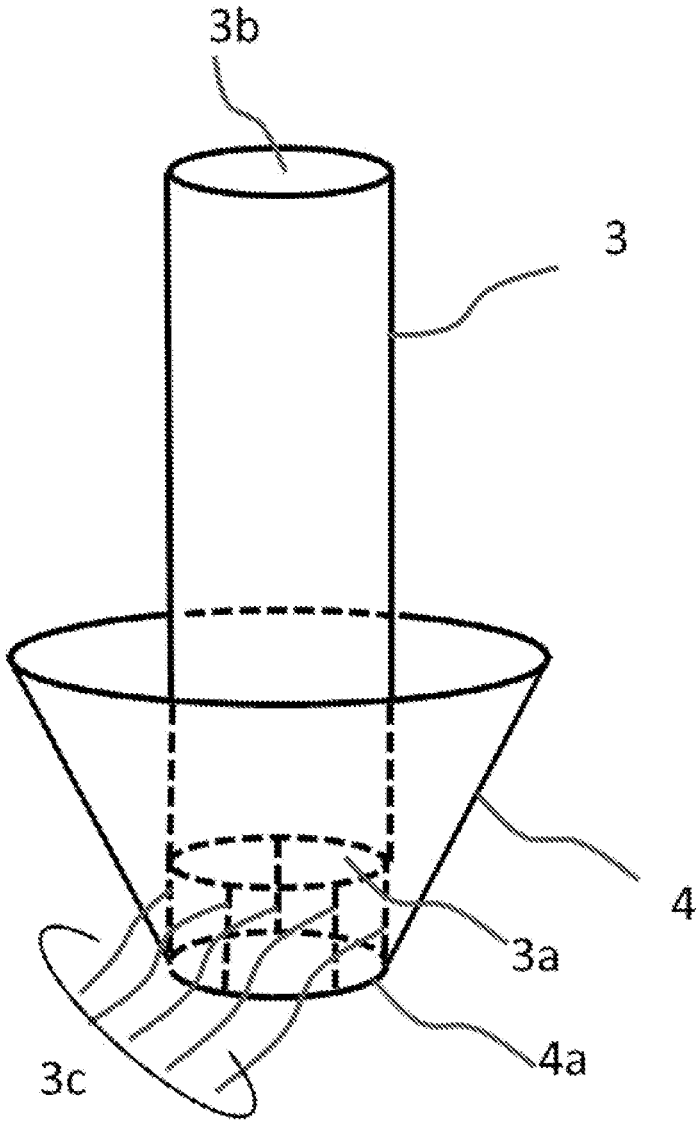
FIG. 3 is an example of a configuration view illustrating the inside of the flocculation cyclone device according to the present invention.

FIG. 3 is an enlarged view illustrating an assembled state of the cylindrical part 3 and inverted truncated cone-shaped inner shell 4 which are arranged at the center portion inside the magnetic cyclone 9 constituting the flocculation cyclone device according to the present invention. The cylindrical part 3 has a vertically-elongated cylindrical shape and has the upper outlet 3b and lower inlet 3a. In order to leave a gap for feeding water or the like entering inside the inner shell 4 into the cylindrical part 3, the lower inlet 3a and bottom surface 4a of the inner shell 4 are connected by a plurality of the intermittently arranged columnar fixing members 3c.

Figure 4:
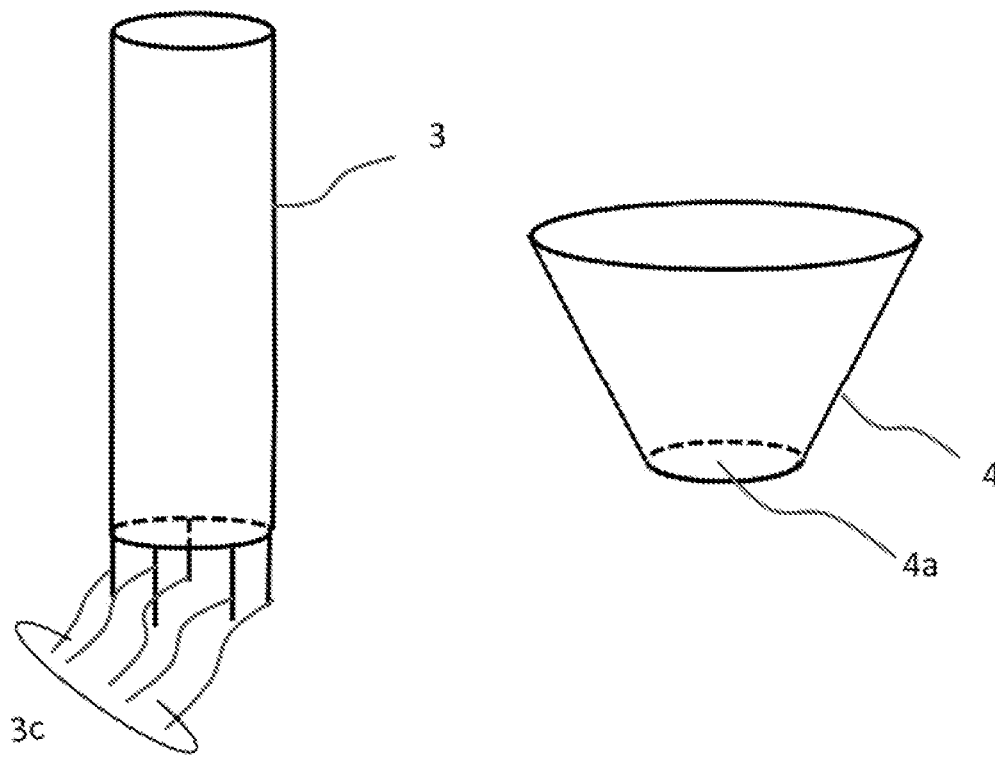
FIG. 4 is an exploded view illustrating the inside of the flocculation cyclone device according to the present invention.

FIG. 4 is an exploded view of the cylindrical part 3 and inverted truncated cone-shaped inner shell 4 which are arranged at the center portion inside the magnetic cyclone 9 constituting the flocculation cyclone device according to the present invention. The lower portion of the cylindrical part 3 is connected with the columnar fixing members 3c. The inner shell 4 is open at the top, tapered downward from the top, and connected at the bottom with the disk-shaped bottom surface 4a.

Connecting the columnar fixing members 3c and bottom surface 4a prevents floating matter in the fluid, such as flocs attracted by magnetic force, and floating matter in the fluid that has a higher specific gravity than water or the like from flowing inside the cylindrical part 3 while allowing other liquids in the fluid to flow thereinside. It should be noted that the same effect as that of the passage formed by the columnar fixing members 3c and bottom surface 4a can be expected also by forming a hole or the like through which the liquid can pass in the vicinity of the lower end surface of the cylindrical part 3.

Figure 5:
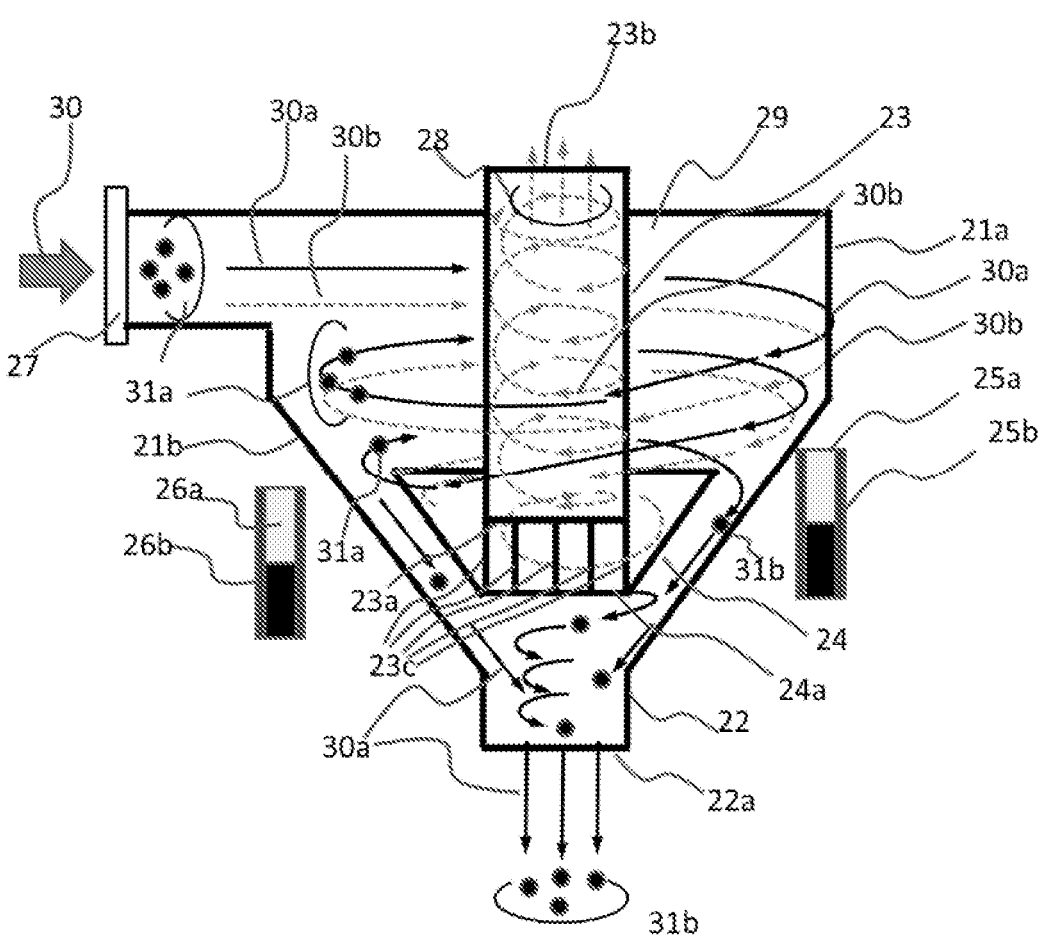
FIG. 5 is an example of another embodiment of the flocculation cyclone device according to the present invention.

FIG. 5 illustrates another embodiment of the flocculation cyclone device according to the present invention. In the magnetic cyclone 29, the side surface of the outer shell 1 is inclined up to the upper part, so that a force directed obliquely upward acts on the fluid, which may reduce the efficiency. A magnetic cyclone 29 is composed of an upper cylindrical outer shell 21a and a lower outer shell 21b having an inverted truncated cone shape. A cylindrical part 23 is disposed at the center portion of the cylindrical outer shell 21a and inverted truncated cone-shaped outer shell 21b. The cylindrical part 23 has an upper outlet 23b and a lower inlet 23a.

The lower inlet 23a is fixed to a bottom surface 24a of an inner shell 24 having an inverted truncated cone shape by columnar fixing members 23c. At the bottom surface 24a of the inner shell 24, an upward flow 28 is generated so as to be directed from the lower inlet 23a toward the inside of the cylindrical part 23 and upper outlet 23b. In the fluid 30 drawn into the magnetic cyclone 29 from an inlet 27, a flow 30b of water or the like is discharged along with the upward flow 28 toward the upper outlet 23b.

Magnets 25a and 26a, such as permanent magnets, are disposed outside the inverted truncated cone-shaped outer shell 21b at portions in the vicinity of the side surface thereof so as to be perpendicular to a flow 30a of flocs 31a. The positions of the magnets 25a and 26a and the magnitude of the magnetic force thereof may be adjusted so that the flocs 31a move along the helical flow 30a. For example, when the magnet 25a is placed higher in position and is made stronger in magnetic force, efficiency will be improved.

Magnetic shields 25*b* and 26*b* are attached respectively to the sides of the magnets 25*a* and 26*a* to prevent the magnetic force from acting in the horizontal direction. If the horizontal magnetic force of the magnet 25*a* and 26*a* does not hinder the flow 30*a* of the flocs 31*a* toward the lower outlet 22*a* of the cylindrical part 22, the magnetic shields 25*b* and 26*b* may be omitted.

Due to the magnetic force of the magnets 25*a* and 26*a*, fluid force, and centrifugal force, the flow 30*a* of the flocs 31*a* becomes a flow 31*b* between the outer shell 21*b* and the inner shell 24, which moves toward the lower outlet 22*a* under the influence of gravity without being affected by the upward flow 28.

Figure 6:
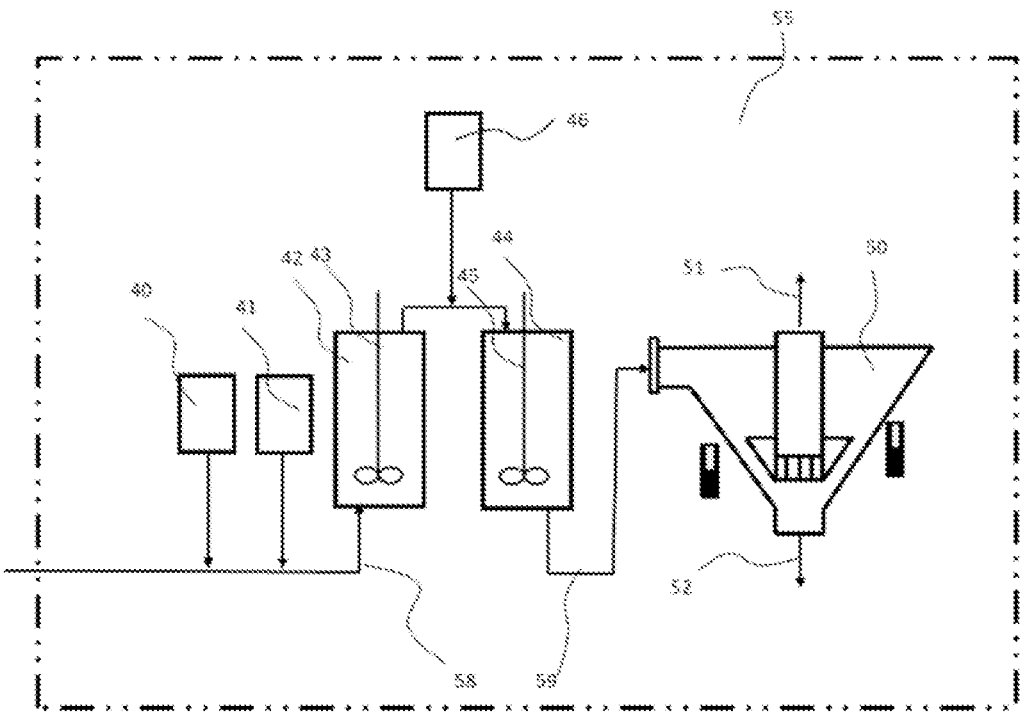
FIG. 6 is an example of a configuration view of a marine plastic removal system using the flocculation cyclone device according to the present invention.

FIG. 6 is a configuration view of a marine plastic removal system using the flocculation cyclone device according to the present invention. In the marine plastic removal system, a slit mechanism (not illustrated) in which blades for shredding large plastics are intermittently arranged vertically, horizontally, or diagonally in a slit shape may be installed at a ballast water intake. Large plastics floating in the sea are broken by the slit mechanism to be collected, and microplastics that cannot be broken by the slit mechanism are collected by the flocculation cyclone device (flocculation magnetic separation system).

A fluid 58 such as seawater or freshwater containing floating matter such as microplastics and aquatic organisms such as plankton flows into a flocculation magnetic separation system 55, and an appropriate amount of flocculant and an appropriate amount of magnetite are put respectively from a flocculant storage tank 40 and a magnetite solution storage tank 41, followed by stirring by means of a stirrer 43 in a rapid stirring device 42, to thereby form microflocs. The flocculant such as inorganic flocculant and magnetite may be put in a desired order and may be put at the same time.

After that, an organic flocculant such as a polymer is put from a polymer storage tank 46 and stirred by means of a stirrer 45 in a slow stirring device 44 to form flocs 59 with a size of several hundred microns to several millimeters. Then, in a magnetic cyclone 50, a fluid 52 containing the flocs 59 and a fluid 51 not containing the flocs 59 are separated by centrifugal force and magnetic force.

Figure 7:
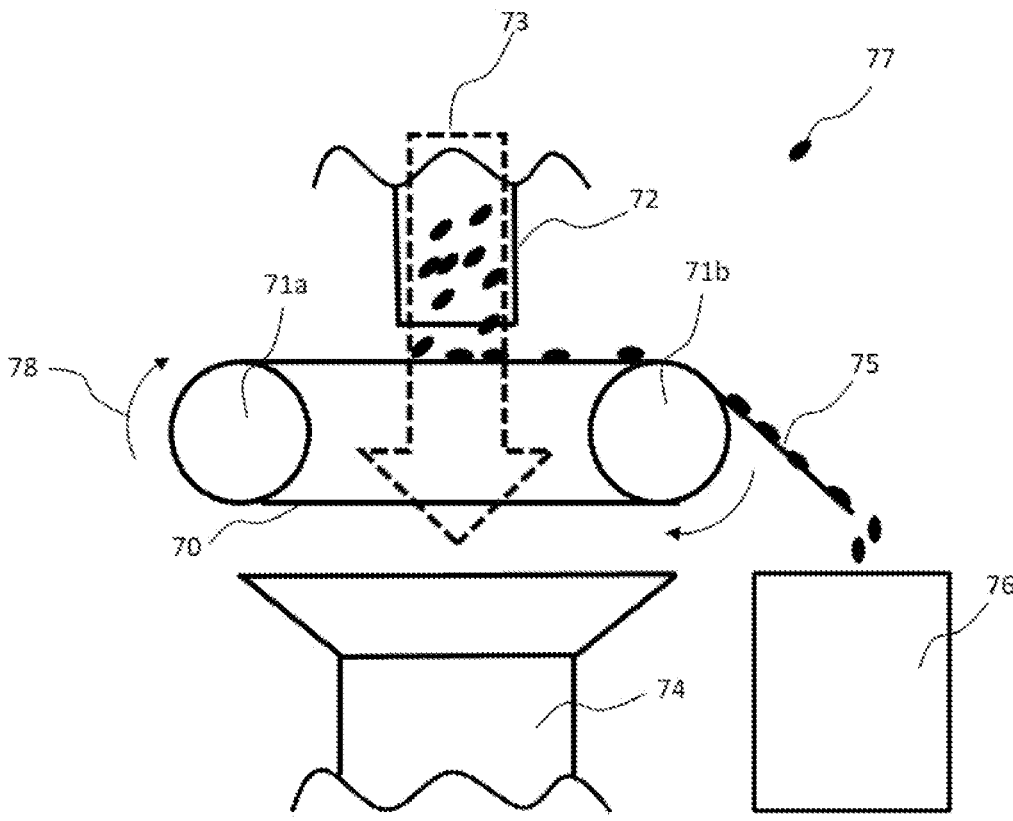
FIG. 7 is an example of a collection mechanism for large plastics with a size of several millimeters or more when the flocculation cyclone device according to the present invention is mounted on a ship.

FIG. 7 illustrates an embodiment of a collection mechanism for large plastics with a size of several millimeters or more when the flocculation cyclone device according to the present invention is mounted on a ship. A fluid 73 such as seawater containing plastics 77 with a size of several millimeters or more is sucked by a ballast pump 72 to be passed through an endless belt filter 70 made of a filter of a given mesh size.

The endless belt filter 70 made of a filter of a given mesh size is driven in rotation 78 continuously between rollers 71*a* and 71*b*. The endless belt filter 70 holds and moves the plastics 77 as the plastic-containing fluid 73 passes between the rollers 71*a* and 71*b*. The plastics 77 are separated by a scraper 75 which is brought into pressure-contact with the endless belt filter 70 and put into a floc collection tank 76. When the floc collection tank 76 is provided with a heat source, moisture can be evaporated from the flocs.

Further, the fluid 73 from which the plastics 77 having a size of several millimeters or more have been removed flows into a pipe 74. The fluid 73 contains fine floating matter such as microplastics and plankton, and is sent to the flocculation magnetic separation system 55 described above.

Figure 8:
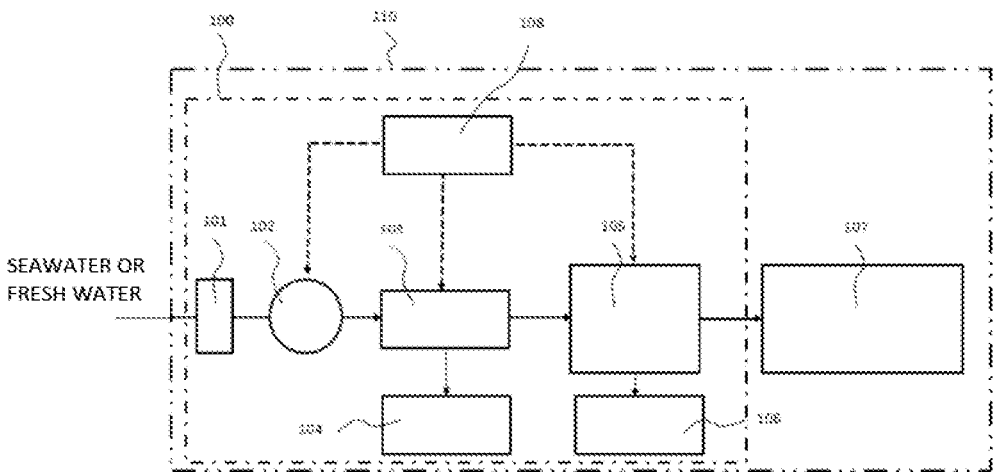
FIG. 8 illustrates an example of the marine plastic removal system using the flocculation cyclone device according to the present invention.

FIG. 8 illustrates an embodiment of the marine plastic removal system using the flocculation cyclone device according to the present invention. A marine plastic removal system 100 for purifying ballast water containing marine plastics and microplastics is installed in a ship 110 and takes in seawater or freshwater by means of a pump 102. The pump 102 is protected by preventing large plastics from entering the system 100.

The marine plastic removal system 100 includes a slit mechanism part 101 having a slit for breaking large plastics and the like, the pump 102 for supplying and draining seawater or fresh water, a collection mechanism part 103 for collecting large floating matter with a size of several tens of millimeters or more, such as broken plastics, a collection tank 104 for temporarily storing the collected floating matter, a flocculation cyclone device 105 for collecting minute floating matter with a size of less than several tens of millimeters, such as microplastics and plankton, a collection tank 106 for removing and temporarily storing flocs containing microplastics and the like, and a control part 108 for controlling each device and managing the entire system using a computer or the like.

Although the slit mechanism part 101 is installed to cut the plastics into small pieces and prevent clogging of the pipe at a later stage, it may be omitted if there is no risk of clogging. Alternatively, the flocculation cyclone device 105 may be a mechanism that combines a filter such as a ceramic filter with ozone or ultraviolet rays. The water after being treated is temporarily stored in a ballast tank 107.

The control part 108 acquires information from each device, stores the information temporarily or for a long term as necessary, calculates operating conditions for each device by computing the information, outputs the calculation result, and transmits an operation signal to each device.

Figure 9:
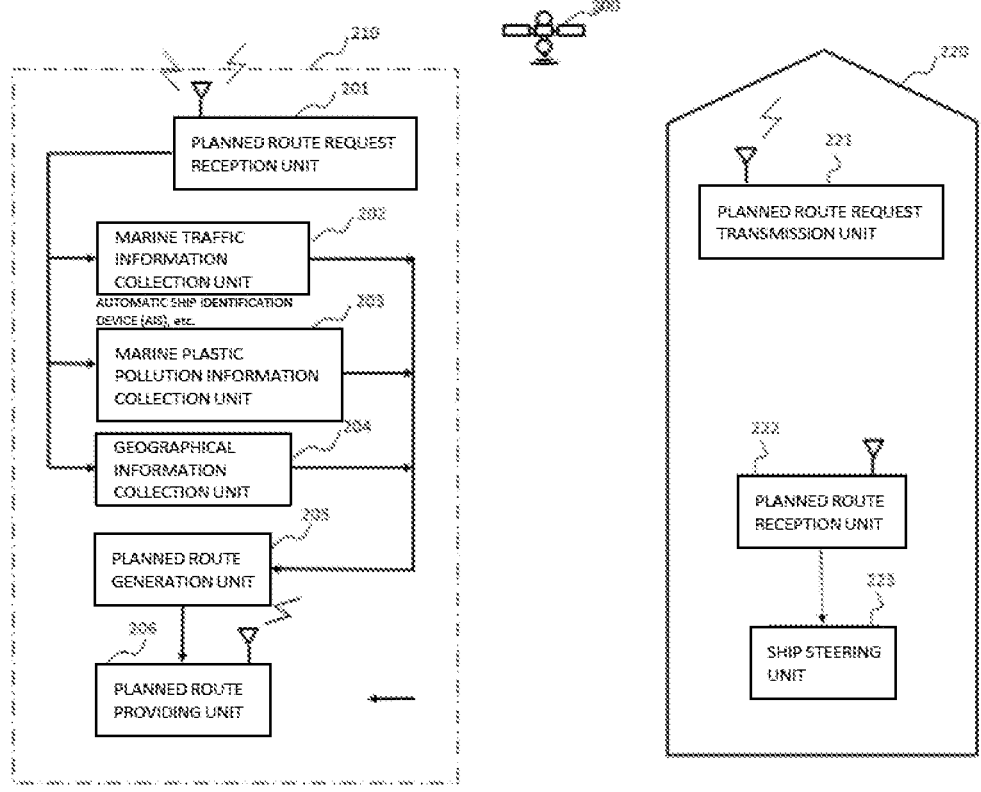
FIG. 9 is an example of an operation method for the marine plastic removal system using the flocculation cyclone device according to the present invention.

FIG. 9 illustrates an embodiment of an operation method for the marine plastic removal system using the flocculation cyclone device according to the present invention. As an example of the operation method for the marine plastic removal system, there is available an operation method for ships. A planned route information center 210 that manages the system includes a marine traffic information collection unit 202, a marine plastic pollution information collection unit 203, a geographical information collection unit 204, a planned route generation unit 205, a planned route request reception unit 201, and a planned route providing unit 206.

The planned route request reception unit 201 receives a planned route request signal from a ship 220 through a communication unit. In response to the request signal, the marine traffic information collection unit 202 collects information of an automatic ship identification device from a base station (not illustrated). The marine plastic pollution information collection unit 203 collects information on conditions of marine pollution due to marine plastics and the like in a sea area captured by the satellite 200. The geographical information collection unit 204 acquires geographical information on an operation route, such as the position of the own ship, a destination port, and a sea area between the own ship and destination port which are included in the planned route request signal. The planned route generation unit 205 generates a planned route based on the information collected by the marine traffic information collection unit 202, marine plastic pollution information collection unit 203, and geographical information collection unit 204.

For example, image processing is applied to image information acquired by the satellite to calculate the concentration of marine plastics and thereby to generate a planned route for efficiently collecting a large amount of marine plastics in a short period of time in consideration of originally planned route information, ocean current information such as ocean current speed and temperature, and information such as whether and climate. When generating this planned route, the presence or absence of ballast water, the amount of ballast water, the propriety of carrying out marine pollution removal work for removing, for example, marine plastics, and the urgency of marine plastic removal work are taken into account. The planned route providing unit 206 transmits, through the communication unit, the generated planned route to the ship 220 that has requested the planned route.

The ship 220 has a planned route request transmission unit 221, a planned route reception unit 222, and a ship steering unit 223 for steering the ship 220 by reflecting the received planned route. Specifically, a planned route is requested for the planned route information center 210 through the planned route request transmission unit 221, and the ship 220 is operated based on the planned route acquired from the planned route information center 210 through the reception unit. Results (target sea area, amount of removed marine pollutants such as marine plastics, and the like.) of the work to remove marine pollution due to marine plastics and the like are transmitted to the planned route information center 210.

The planned route information center 210 transmits this information to public organizations such as the International Maritime Organization (IMO) and environmental protection groups. International organizations such as the IMO and environmental groups make this information public and develop strategies to combat marine pollution. If further removal is necessary, vessels planning to navigate in the vicinity of the sea area are asked to cooperate in marine pollution countermeasures. In addition, the marine pollutants such as collected marine plastics are purchased as industrial waste by the governments and local governments of the ports of call. Thus, ships equipped with the marine plastic removal system take on the task of marine cleaning in addition to transporting valuable materials such as oil.

According to the present invention, there can be provided a low-cost, small-sized collection device capable of preventing breakage of a floc, which is a mass of magnetic substances such as magnetite and substances floating in fluid such as plankton and microplastics, when collecting the floc by means of centrifugal force and magnetic force.

Further, when collecting floating plastics in the sea with the collection mechanism, it is possible to install the slit mechanism for shredding marine plastics to shred the marine plastics and to thereby collect them with the collection mechanism at a later stage. By collecting microplastics that cannot be broken by the slit mechanism with the flocculation cyclone device, the problem of marine pollution can be solved. Further, by determining, using satellite information, the route to a sea area where a large amount of plastics are floating and collecting the marine plastics in the sea area where there are a large amount of plastics, it is possible to efficiently remove marine pollution.

Although the embodiments of the present invention have been described above, the present invention is not limited to the above embodiments. For example, it is possible to treat produced water that generates harmful gases such as hydrogen sulfide during petroleum production without bringing the produced water into contact with the outside air.

REFERENCE SYMBOLS LIST

1, 21a, 21b: Outer shell
2, 22: Cylindrical part
2a, 22a: Lower outlet
3, 23: Cylindrical part

3a, 23a: Lower inlet
3b, 23b: Upper outlet
3c, 23c: Fixing member
4, 24: Inner shell
4a, 24a: Bottom surface
5a, 25a, 26a: Magnet
5b, 25b, 26b: Magnetic shield
7, 27: Inlet
8, 20a, 28: Upward flow
9, 29, 50: Magnetic cyclone
10, 20, 30: Fluid
10a, 10b, 30a, 30b, 31b: Flow
11a, 11b, 31a: Floc
40: Flocculant storage tank
41: Magnetite solution storage tank
42: Rapid stirring device
44: Slow stirring device
43, 45: Stirrer
46: Polymer storage tank
51, 52: Fluid
55: Flocculation magnetic separation system
58, 73: Fluid
59: Floc
70: Endless belt filter
71a, 71b: Roller
72: Ballast pump
74: Pipe
75: Scraper
76: Floc collection tank
77: Plastic
78: Rotation
100: Marine plastic removal system
101: Slit mechanism part
102: Pump
103: Collection mechanism part
104, 106: Collection tank
105: Flocculation cyclone mechanism
107: Ballast tank
108: Control part
110: Ship
200: Satellite
201: Planned route request reception unit
202: Marine traffic information collection unit
203: Marine plastic pollution information collection unit
204: Geographical information collection unit
205: planned route generation unit
206: Planned route providing unit
210: Planned route information center
220: Ship
221: Planned route request transmission unit
222: Planned route reception unit
223: Ship steering unit

The invention claimed is:

1. A flocculation cyclone device that collects magnetic flocs, which are obtained by putting a magnetic substance and a flocculant into floating matter in a fluid and flocculating them by centrifugal force and magnetic force, the flocculation cyclone device comprising:

an inverted truncated cone-shaped outer shell that helically rotates fluid containing flocculated flocs;

a cylindrical part disposed in a center portion of the outer shell so as to pass fluid through the outer shell upward;

a dish-shaped inner shell that is installed inside the outer shell and surrounds a lower portion of the cylindrical part; and a magnet disposed outside the outer shell in the vicinity of the side surface thereof, wherein the cylindrical part is connected to the inner shell by a plurality of intermittently arranged fixing members, a fluid between the cylindrical part and the inner shell is discharged with an upward flow generated in the cylindrical part, while the flocs are guided by the magnet between the outer shell and the inner shell are discharged from a lower end of the outer shell.

2. The flocculation cyclone device according to claim 1, wherein the magnet is attached to a magnetic shield to suppress horizontal magnetic force thereof.

3. The flocculation cyclone device according to claim 1, wherein the magnet is disposed such that the flocs are guided along a helical flow.

4. A marine plastic removal system, comprising the flocculation cyclone device as claimed in claim 1 and a collection mechanism, wherein the marine plastic removal system purifies ballast water using the flocculation cyclone device as, wherein a slit mechanism in which blades for shredding plastics are intermittently arranged in a slit shape installed at a ballast water intake, wherein marine plastics are broken by the slit mechanism and are collected by the collection mechanism, and flocs that have been formed by putting a flocculant and magnetite to microplastics that cannot be broken by the slit mechanism and stirring them with a stirrer are collected by the flocculation cyclone device.

5. A ship equipped with the system as claimed in claim 4.

6. A ship equipped with the flocculation cyclone device as claimed in claim 1.

7. A flocculation cyclone device that collects magnetic flocs, which are obtained by putting a magnetic substance and a flocculant into floating matter in a fluid and flocculating them by centrifugal force and magnetic force, the flocculation cyclone device comprising:

an inverted truncated cone-shaped outer shell that helically rotates fluid containing flocculated flocs;

a cylindrical part disposed in a center portion of the outer shell so as to pass fluid through the outer shell upward;

a dish-shaped inner shell that is installed inside the outer shell and surrounds a lower portion of the cylindrical part; and a magnet disposed outside the outer shell in the vicinity of the side surface thereof, wherein the magnet is attached to a magnetic shield to suppress horizontal magnetic force thereof, and a fluid between the cylindrical part and the inner shell is discharged with an upward flow generated in the cylindrical part, while the flocs are guided by the magnet between the outer shell and the inner shell are discharged from a lower end of the outer shell.

8. The flocculation cyclone device according to claim 7, wherein the magnet is disposed such that the flocs are guided along a helical flow.

9. A marine plastic removal system, comprising the flocculation cyclone device as claimed in claim 7 and a collection mechanism, wherein the marine plastic removal system purifies ballast water using the flocculation cyclone device, wherein a slit mechanism in which blades for shredding plastics are intermittently arranged in a slit shape installed at a ballast water intake, wherein marine plastics are broken by the slit mechanism and are collected by the collection mechanism, and flocs that have been formed by putting a flocculant and magnetite to microplastics that cannot be broken by the slit mechanism and stirring them with a stirrer are collected by the flocculation cyclone device.

10. A ship equipped with the flocculation cyclone device as claimed in claim 7.

11. A ship equipped with the system as claimed in claim 9.

* * * * *